US006600717B2

(12) United States Patent
Hayashida et al.

(10) Patent No.: US 6,600,717 B2
(45) Date of Patent: Jul. 29, 2003

(54) OPTICAL INFORMATION MEDIUM (75) Inventors: Naoki Hayashida, Chuo-ku (JP); Hideki Hirata, Chuo-ku (JP); Tsuyoshi Komaki, Chuo-ku (JP)

(73) Assignee: TDK Corporation, Tokyo (JP)

( * ) Notice: Subject to any disclaimer, the term of this patent is extended or adjusted under 35 U.S.C. 154(b) by 151 days.

(21) Appl. No.: 09/951,742

(22) Filed: Sep. 14, 2001

(65) Prior Publication Data
US 2002/0051423 A1 May 2, 2002

(30) Foreign Application Priority Data

Sep. 14, 2000 (JP) ........................................ 2000-279750
Jul. 4, 2001 (JP) ........................................ 2001-204121

(51) Int. Cl.$^7$ ............................. G11B 7/24; G03C 1/492
(52) U.S. Cl. ..................... 369/286; 369/288; 430/271.1
(58) Field of Search ............................. 369/286, 288, 369/275.5, 275.2, 283, 284; 430/270.1, 270.11, 270.12, 271.1, 945; 428/64.1, 64.2, 64.4, 64.6, 64.7; 252/588, 584

(56) References Cited

U.S. PATENT DOCUMENTS

| 4,569,871 | A | * | 2/1986 | Ohmori et al. ............ 428/64.4 |
| 4,911,966 | A | * | 3/1990 | Murayama et al. ......... 428/65.1 |
| 2002/0096667 | A1 | * | 7/2002 | Leveille ...................... 252/588 |
| 2003/0004297 | A1 | * | 1/2003 | van Osselaer et al. ...... 528/125 |

FOREIGN PATENT DOCUMENTS

| JP | 02180954 A | * | 7/1990 | ........... C08L/67/02 |
| JP | 07262606 A | * | 10/1995 | ........... G11B/7/24 |
| JP | 8-143689 |   | 6/1996 |   |
| JP | 10-320859 |   | 12/1998 |   |
| JP | 11-120613 |   | 4/1999 |   |
| JP | 2000-33672 |   | 2/2000 |   |
| WO | WO 200116950 A1 | * | 3/2001 | ........... G11B/7/24 |
| WO | WO 200182298 A1 | * | 11/2001 | ............. C08F/8/04 |

* cited by examiner

Primary Examiner—William Klimowicz
(74) Attorney, Agent, or Firm—Oblon, Spivak, McClelland, Maier & Neustadt, P.C.

(57) ABSTRACT

An optical information medium is provided which has a light-transmitting substrate which exhibits excellent light transmittance when a laser beam of blue/violet region or ultraviolet region is used as the recording and/or reading beam; whose light transmittance is not substantially affected by the variation or fluctuation of the oscillation wavelength of the laser beam source; which has a long-term weatherability; and which exhibits sufficient protective effects against exterior impacts. The optical information medium includes an information recording layer and a light-transmitting substrate, and the medium is used such that the recording and/or reading laser beam reaches the information-recording layer through the light-transmitting substrate. The light-transmitting substrate has a light transmittance T and difference $\Delta T$ between the maximum value and the minimum value of the light transmittance T in arbitrary wavelength range of 10 nm which satisfies the relations: $T \geq 0.8$ and $\Delta T \leq 0.10$ at least in the wavelength region of 250 to 450 nm.

7 Claims, 3 Drawing Sheets

LASER BEAM

OPTICAL INFORMATION MEDIUM

BACKGROUND OF THE INVENTION

This invention relates to an optical information medium such as read only optical disk and optical recording disk.

Optical disks which are recorded and/or read by a light beam such as semiconductor laser beam have become widely popular as an information medium for recording various information including audio and image information.

Most of the optical information media used nowadays are those wherein the information is recorded and/or read in two dimensional manner, and it is not so popular to record a plurality of signals in three dimensional manner, namely, in the depth direction of the information recording layer. Accordingly, increase in the recording capacity needs to be accomplished by increase in two dimensional recording density, namely, by increase in the recording density in the lateral directions of the information recording layer.

The recording density of the main stream optical information medium of today is determined by the beam spot diameter of the laser beam used for the reading of the information recorded in the medium. To be more specific, the recording density can be increased by reducing the beam spot diameter which is proportional to the $\lambda/NA$ (wherein $\lambda$ is wavelength of the laser beam and NA is the numerical aperture of the objective lens) of the optical system used in the reading. Accordingly, increase in the recording density of an optical information medium needs reduction in the wavelength $\lambda$ and increase in the numerical aperture NA. For example, an optical system used with a CD (Compact Disk) has a wavelength $\lambda$ of 780 nm and a NA of 0.45 and the one used with a DVD (Digital Versatile Disk) has a wavelength $\lambda$ of 650 nm and a NA of 0.60, and as a result, the theoretical minimum readable pit length is 0.43 $\mu$m in the case of the CD and 0.27 $\mu$m in the case of the DVD. In the near future, the semiconductor laser which is used as the light source is likely to be the one having a shorter wavelength, namely, the one in blue/violet region or ultraviolet region to realize further improvement in the recording density.

An optical disk typically has a structure wherein an information recording layer is formed on a light-transmitting substrate, and the recording and/or reading laser beam reaches the information recording layer through the light-transmitting substrate. Accordingly, it is desirable that the light-transmitting substrate is formed from a material which exhibits minimum possible loss of the light that passes therethrough by absorption.

The semiconductor laser which is commonly used for the light source inevitably suffers from variety in the oscillation wavelength from product to product, and this variation is normally within the range of about 10 to 20 nm. The oscillation wavelength also fluctuates depending on the exterior temperature even for the same product, and for example, the oscillation wavelength may fluctuate within the range of about 10 nm when the temperature is in the range of 0° C. to 60° C. The light-transmitting substrate, therefore, should exhibit a high light transmittance at the wavelength of the recording/reading beam as well as no significant change in the light transmittance at and near the wavelength of the recording/reading beam. It is also necessary to select a material which undergoes no substantial change in the light transmittance over the long period for the light-transmitting substrate.

The light-transmitting substrate typically comprises a thermoplastic resin such as polycarbonate or polymethyl methacrylate (PMMA) in view of the excellent moldability and high transparency as well as the low cost. These resins exhibit good transparency to the beams of infrared or red region which are used as the recording/reading beams for the current commercial optical disks.

Increasing the NA of the objective lens, however, leads to a reduced tilt margin. The tilt margin is a permissible tilt of a medium relative to the optical axis of the optical system, which depends on the numerical aperture NA. The tilt margin is in proportion to $$\lambda/(t \cdot NA^3)$$

wherein $\lambda$ denotes wavelength of the recording/reading beam and "t" denotes thickness of the light-transmitting substrate through which the recording/reading beam enters the medium. If the optical recording medium is inclined or tilted relative to the laser beam, a wavefront aberration (or coma) occurs. The coefficient of wavefront aberration is represented by $$(\tfrac{1}{2}) \cdot t \cdot \{n^2 \cdot \sin\theta \cdot \cos\theta\} \cdot NA^3/(n^2-\sin^2\theta)^{-5/2}$$

wherein n denotes the refractive index of the substrate and $\theta$ is a tilt angle. It is appreciated from these formulae that the tilt margin may be increased and the occurrence of comatic aberration be suppressed by reducing the thickness "t" of the light-transmitting substrate. In fact, the DVD design is such that a tilt margin is secured by reducing the thickness of the substrate to about one half (about 0.6 mm) of the thickness (about 1.2 mm) of the CD substrate.

A structure enabling further decrease in the light-transmitting substrate thickness has been proposed in order to enable use of an objective lens of larger numerical aperture NA. In this structure, a substrate having a thickness of about 1 mm is used as a supporting substrate for ensuring rigidity of the medium, and the pits and the recording layer are formed on its surface, and a light-transmitting layer in the form of a thin substrate having a thickness of about 0.1 mm is formed on the recording layer. The medium is irradiated with the recording/reading beam through this light-transmitting layer. This structure enables drastic reduction in the thickness of the substrate, and high density recording by the use of a higher NA is thereby enabled. A medium having such structure is described, for example, in Japanese Patent Application Laid-Open Nos. (JP-A) 320859/1998 and 120613/1999. Provision of the light-transmitting layer with the thickness of about 0.1 mm enables an objective lens having a large NA of, for example, about 0.85.

Polycarbonate, PMMA, and other thermoplastic resins which had been typical materials for use in producing the light-transmitting substrate normally undergo decrease in the transparency as the wavelength of the light source becomes shorter, and these materials exhibit rapid increase in the absorption when the wavelength gets as short as about 400 nm or shorter. Therefore, use of such resins for the light-transmitting substrate is unfavorable in the optical disks wherein a beam in the blue to ultraviolet region is used for the recording and/or reading.

These resins also experience secular deterioration caused by the UV-containing light such as sunlight, and as a result, absorption increases at a wavelength shorter than about 400 nm. It is quite difficult to realize stable recording/reading properties for prolonged period by using such resin when a light in the region of blue to ultraviolet is used for the recording/reading.

Metal oxide layers such as the one comprising $SiO_2$ and the like are known to be a film which exhibits good transparency in a short wavelength region of approximately 400 nm. A metal oxide layer, however, is usually formed by a thin film-forming process such as evaporation or sputtering and the metal oxide layer can not be used for a light-transmitting substrate which needs a thickness of at least about 0.1 mm. A process which requires a vacuum such as evaporation or sputtering is also inevitably associated with increase in the scale of the installation and complication of the production process as well as problem of an increased cost.

The present invention has been completed in view of the situation as described above, and an object of the present invention is to provide an optical information medium provided with a light-transmitting substrate which exhibits excellent light transmittance when a laser beam of blue/violet region or ultraviolet region is used for the recording and/or reading beam; whose light transmittance is not substantially affected by the variation or fluctuation in the oscillation wavelength of the laser beam source; which has a long-term weatherability; and which exhibits sufficient protective effects against exterior impacts.

SUMMARY OF THE INVENTION

Such objects are attained by the present invention as described in (1) to (7), below.

(1) An optical information medium comprising an information recording layer and a light-transmitting substrate, which is used such that the laser beam for recording and/or reading reaches said information-recording layer through said light-transmitting substrate, wherein said light-transmitting substrate has a light transmittance T and difference $\Delta T$ between the maximum value and the minimum value of the light transmittance T in an arbitrary wavelength range of 10 nm which satisfy the relations:

$T \geq 0.8$, $\Delta T \leq 0.10$ at least in the wavelength region of 250 to 450 nm.

(2) An optical information medium according to the above (1) wherein the relations:

$T \geq 0.8$, $\Delta T \leq 0.10$ are satisfied at least in the wavelength region of 200 to 450 nm.

(3) An optical information medium according to the above (1) wherein the relations:

$T \geq 0.8$, $\Delta T \leq 0.10$ are satisfied at least in the wavelength region of 250 to 450 nm after 500 hour exposure to laboratory light used in the methods of exposure to laboratory light sources defined in JIS K7350-2-1995.

(4) An optical information medium according to the above (1) wherein said light-transmitting substrate includes at least one resin layer, and at least one layer of said resin layer(s) contains a fluorohydrocarbon-based resin.

(5) An optical information medium according to the above (1) wherein said light-transmitting substrate has a surface layer which constitutes the beam incident surface of the medium and an inner layer between said surface layer and said information-recording layer;

said inner layer is a resin layer containing a fluorohydrocarbon-based resin;

said surface layer comprises an organic compound other than said fluorohydrocarbon-based resin and/or an inorganic compound; and said surface layer has a thickness less than that of said inner layer.

(6) An optical information medium according to the above (4) wherein said resin layer containing the fluorohydrocarbon-based resin is amorphous.

(7) An optical information medium according to the above (1) wherein the light-transmitting substrate has a thickness of 5 to 300 µm.

DETAILED DESCRIPTION OF THE INVENTION

The light-transmitting substrate provided in the optical information medium of the present invention has a high light transmittance in the short wavelength region. The light-transmitting substrate also exhibits small fluctuation in the light transmittance in the short wavelength region for a wavelength region of about 10 nm corresponding to the variation in the oscillation wavelength of a semiconductor laser. Therefore, the medium of the present invention exhibits excellent recording/reading properties when a light beam in the blue to ultraviolet region is used for the recording/reading beam.

In order to enable the light-transmitting substrate to have the light transmittance and its fluctuation within the scope of the present invention, the light-transmitting substrate is preferably formed from a fluorohydrocarbon-based resin. The fluorohydrocarbon-based resin also exhibits a good weatherability, and to be more specific, a small change in optical properties under UV exposure, and the light transmittance as described above can be maintained for a prolonged period.

In the present invention, the entire light-transmitting substrate may be formed from a fluorohydrocarbon-based resin. In order to further improve the scratch resistance of the light-transmitting substrate, the light-transmitting substrate may be constituted from a surface layer serving the light incident surface of the medium and an inner layer separately formed from the surface layer in the interior of the surface layer, and the inner layer may comprise a fluorohydrocarbon-based resin and the surface layer may comprise a material having a higher scratch resistance. The surface layer will retain its sufficient scratch resistance even if its thickness were reduced considerably below that of the inner layer, and the thickness of the surface layer can be reduced. Therefore, the optical requirements for the surface layer is not very strict, and a material having a good scratch resistance can be relatively freely selected from various organic and inorganic materials.

Figure 1:
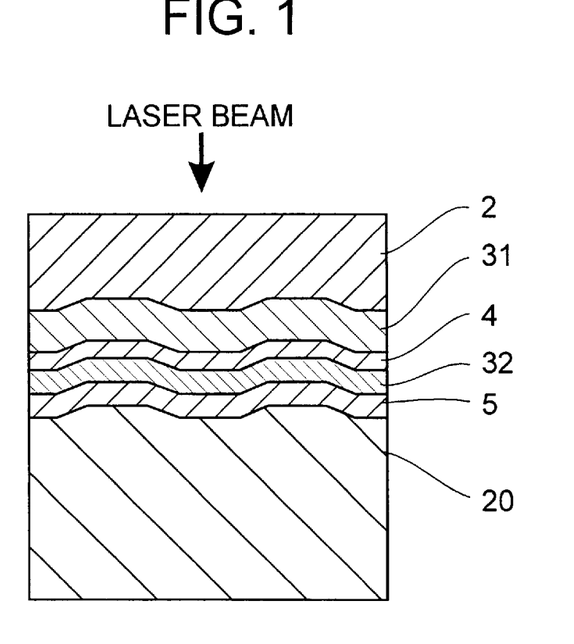
FIG. 1 is a cross sectional view of the optical recording medium according to an embodiment of the present invention.
Figure 2:
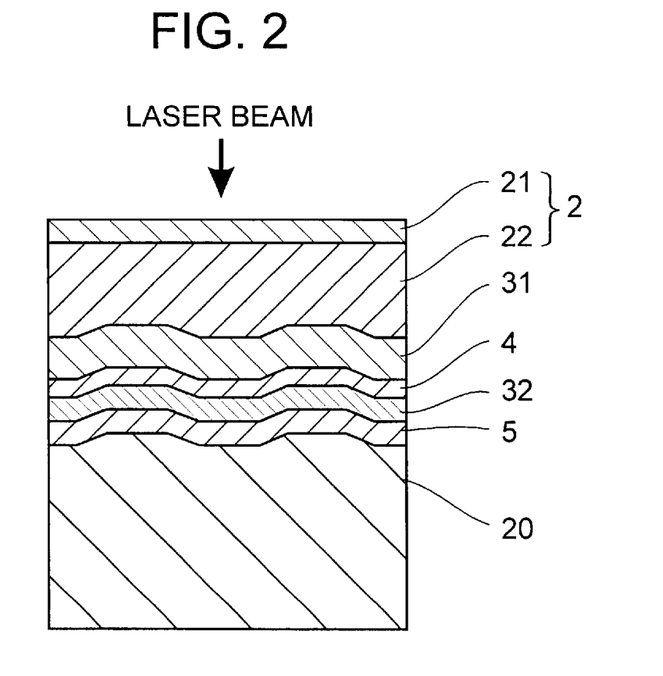
FIG. 2 is a cross sectional view of the optical recording medium according to another embodiment of the present invention.

Referring to FIGS. 1 and 2, there are illustrated embodiments of the optical information medium of the present invention. This optical information medium is a phase change recording medium including a supporting substrate 20, and a reflective layer 5, a second dielectric layer 32, an information recording layer in the form of a recording substrate 4, a first dielectric layer 31, and a light-transmitting substrate 2 formed in this order on the supporting substrate 20. The recording or reading laser beam is passed to the recording layer 4 through the light-transmitting substrate 2.

The present invention is applicable to any type of recording layer. To be more specific, the present invention is applicable not only to the phase change recording medium of the illustrated embodiment, but also to a pit formation type recording medium or a magneto-optical recording medium. In addition, the present invention is not limited to the medium of recordable type as in the illustrated embodiment, and may also be applicable to a medium of read-only type. In the latter case, the reflective layer which is formed over the pit train that had been integrally formed with the supporting substrate 20 constitutes the information recording layer.

Figure 3:
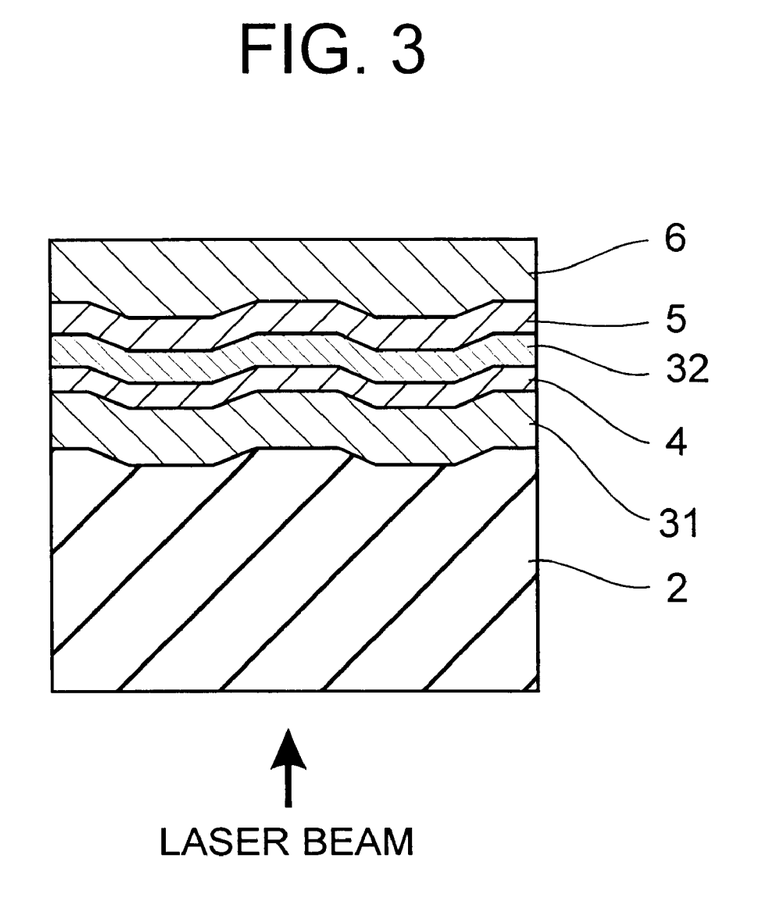
FIG. 3 is a cross sectional view of the optical recording medium according to another embodiment of the present invention.

The present invention is also applicable to the medium having the structure shown in FIG. 3. The medium shown in FIG. 3 comprises a light-transmitting substrate 2, and a first dielectric layer 31, a recording substrate 4, a second dielectric layer 32, a reflective layer 5, and a protective layer 6 formed in this order on the light-transmitting substrate 2. In this embodiment, a rigid light-transmitting substrate 2 is used, and the arrangement of the layers is the same as that of FIG. 1 when seen from the side of the laser beam incidence except for the protective layer 6. It is to be noted that two mediums each having the structure of FIG. 3 may be bonded to each other with the recording layer in the inner side so as to constitute a double side recording medium.

In the present invention, the light-transmitting substrate may have a light transmittance T of $$T \geq 0.8,$$

and preferably $$T \geq 0.85$$

in the short wavelength region, and to be more specific, in the entire wavelength region of from 250 nm to 450 nm, and at least in the entire wavelength region of from 200 nm to 450 nm. The light transmittance T below such level in the wavelength region as described above is undesirable since a high output semiconductor laser will be needed when the medium is recorded and/or read by using a laser beam of blue to ultraviolet region.

In addition, the difference $\Delta T$ between the maximum value and the minimum value of the light transmittance T in an arbitrary wavelength range of 10 nm, and preferably 20 nm is such that:

$$\Delta T \leq 0.10$$

in the short wavelength region, and to be more specific, in the entire wavelength region of from 250 nm to 450 nm, and at least in the entire wavelength region of from 200 nm to 450 nm. When $\Delta T$ is small, the light-transmitting substrate will be less affected by the variation in the oscillation wavelength due to individual difference of the semiconductor laser and fluctuation in the oscillation wavelength. In contrast, a large $\Delta T$ is undesirable since the medium will then experience fluctuation in the recording sensitivity and/or signal output in the reading corresponding to the variation and the fluctuation in the oscillation wavelength.

No particular upper limit is set for the light transmittance T. The light transmittance T, however, can not be raised to 1 and T is generally in the range of:

$$T \leq 0.98$$

The $\Delta T$ can not be reduced to 0, and the $\Delta T$ is generally in the range of:

$$\Delta T \geq 0.001.$$

In the present invention, the light-transmitting substrate is also required to have an excellent weatherability, and to be more specific, it is preferable that the light-transmitting substrate undergoes no significant deterioration in its optical properties after 500 hour exposure to artificial light (laboratory light) defined in the methods of exposure to laboratory light sources defined in JIS K7350-2-1995 (ISO 4892-2:1994). It should be noted that "no significant deterioration in the optical properties of the light-transmitting substrate" means that the light transmittance T and the $\Delta T$ are within the ranges as defined above after the exposure. The artificial light recommended in the laboratory light exposure test as described above is the light produced as described below by using xenon-arc source for the light source. The light source is first covered with a filter so that the spectral distribution of the radiation energy resembles that of the sun light on earth as defined by CIE No. 85:1989, and an adjustment is made so that the spectral irradiance is 0.50 $Wm^{-2}nm^{-1}$ at the wavelength of 340 nm. At this moment, the total radiation in the wavelength of 290 to 800 nm should be about 550 $Wm^{-2}$ and the light emitted under such conditions is the artificial light as defined above.

The material used for the light-transmitting substrate is not particularly limited, and an adequate material may be selected so that the light transmittance T and the $\Delta T$ fall within the ranges as defined above in the short wavelength region.

Examples of such material include a siloxane compound formed by sol-gel process using a solution of an organosilane compound containing a hydrolyzable group such as an alkoxy group. The film formed by sol-gel process from a metal compound such as a tetraalkoxysilane is typically as thin as about 0.1 $\mu$m and far from being sufficient in mechanical strength nor abrasion resistance. The thickness, however, can be increased by introducing an organic residue such as an alkyl chain in the metal compound used, and the compound can be then used for the light-transmitting substrate.

The light-transmitting substrate may be also formed from a film of a siloxane compound derived from a polysilazane film. The film of the siloxane compound derived from a polysilazane film may be produced by the methods disclosed, for example, in JP-A 143689/1996 and JP-A 33672/2000. Again in this case, the thickness of the film can be increased by introducing an organic residue in the silicon atom.

The light-transmitting substrate may be also formed from a material containing an organic compound as its main component, and the most preferred is a fluorohydrocarbon-based resin.

Among the materials used for the light-transmitting substrate as described above, the most preferred is a fluorohydrocarbon-based resin, and in particular, the fluorohydrocarbon-based resin selected according to the conditions as described below.

When the fluorohydrocarbon-based compound has a double bond or a triple bond based on sp$^2$ hybridized orbit of the carbon atom within its molecular structure, absorption based on π–π* electronic transition is most likely to takes place in the ultraviolet-blue region. Therefore, the content of the carbon-carbon double bond and/or triple bond should be as low as possible. To be more specific, aromatic ring such as benzene ring and naphthalene ring and conjugated double bond such as 1,3-diene are undesirable since the π–π* transition energy is low, and absorption is likely to take place in long-wavelength side within the wavelength region of 250 to 450 nm. In addition, ordinary sigma bond between carbon and hydrogen (C—H bond) has a bond energy lower than that of the sigma bond between carbon-fluorine (C—F bond), and absorption is likely to take place within the wavelength region of 250 to 450 nm in the region longer than that of the C—F bond. Therefore, it is preferable that C—H bond is absent in the molecular structure and this also applies to the single bond based on sp$^3$ hybridized orbital of the carbon atom. In other words, the ratio of the number of carbon atoms ($N_c$) to the number of fluorine atoms ($N_f$) in the polymer chain, namely, $N_f/N_c$ is preferably in the range of 0.5 to 2.5, and more preferably in the range of 1.0 to 2.0.

By the way, even if a fluorohydrocarbon-based resin which has a molecular structure less likely to cause absorption in the region of blue to ultraviolet were selected based on the conditions as described above, the fluorohydrocarbon-based resin as a whole may exhibit absorption due to its crystalline structure. In view of such situation, the material used is preferably the one which has a molecular structure as described above, and at the same time, the one which does not develop a crystalline structure as bulk but becomes amorphous. In terms of this, control of crystallizability by introducing a bulky substituent in the molecule is effective, and exemplary compounds are those having introduced in their molecular structure the skeleton of a perfluorocyclic alkane such as perfluorocyclohexane, perfluorocyclopentane, or perfluoronorbornane, a perfluorocyclic ether such as perfluorofurane or perfluoropirane, or a derivative thereof. Such introduction of a bulky skeleton for the purpose of making the compound amorphous also results in the improvement in the solubility of the compound in various solvents, and this realizes a wide choice of the method employed in the formation of the light-transmitting substrate. Exemplary such amorphous fluorohydrocarbon-based resins include those purchased under the trade names of CYTOP(R) from Asahi Glass Company and Teflon(R) AF from DuPont.

In the present invention, the light-transmitting substrate may have a multi-layer structure. The medium of the embodiment shown in FIG. 2 has a light-transmitting substrate 2 of bi-layer structure comprising a surface layer 21 constituting the light-incident surface, an inner layer 22 between the surface layer 21 and the information recording layer (recording layer 4) underneath it, and the recording layer.

This structure is advantageous in realizing the optical properties of the light-transmitting substrate as described above, and at the same time, in improving the scratch resistance. In this structure, a fluorohydrocarbon-based resin may be used for the material of the inner layer and a material having a scratch resistance higher than the material used for the inner layer may be used for the surface layer. The surface layer may be formed from a material which is adequately selected from organic compounds other than the resin used for the inner layer and/or inorganic compounds.

Examples of the organic compounds which are preferable for the inner layer include radiation-curable resins. The surface layer comprising such a resin may be formed by coating a polymerization curable compound having at least two polymerizable functional groups such as acryloyl group in the molecule, and curing the coating with a radiation such as UV. Such radiation-curable resins, however, suffer from the problems in optical properties and weatherability as in the case of the thermoplastic resins as described above. To be more specific, when the light-transmitting substrate is formed solely from a radiation-curable resin, the layer may not have a sufficient transparency for the short wavelength beam of blue to ultraviolet region, and the optical properties of the layer are also likely to be damaged by exposure to UV radiation with the light transmittance of the layer in the short wavelength region experiencing further decrease. The surface layer, however, may have a thickness less than that of the light-transmitting substrate since it is a layer formed to provide the light-transmitting substrate with scratch resistance, and a sufficient scratch resistance is secured when the surface layer has a thickness of as thin as 2 μm at most. Therefore, even if such surface layer were provided, the light-transmitting substrate as a whole can be easily provided with the light transmittance T and the ΔT in the short wavelength region of the ranges as defined above. It is to be noted that, if the surface layer is formed from an organic material, the surface layer is preferably formed to a thickness of at least 0.2 μm, and more preferably, to a thickness of at least 0.5 μm to thereby provide the layer with a sufficient scratch resistance.

Examples of the inorganic compounds which may be preferably used for the surface layer include metal oxides such as silica, alumina, and titanium oxide; metal nitride such as silicon nitride; metal carbides such as calcium carbide and silicon carbide; and metal halides such as magnesium fluoride. The surface layer may comprise any one material or a mixture of two or more selected from the foregoing. The inorganic materials as mentioned above enjoy an excellent scratch resistance, and also, a better light transmittance in the short wavelength region and a better weatherability compared to the radiation-curable resins as described above. The surface layer comprising such inorganic compound is typically formed by vacuum deposition such as sputtering and evaporation to a typical thickness of 0.05 to 1 μm, and preferably, to a thickness of 0.1 to 0.5 μm. An excessively thin surface layer is ineffective in realizing the desired improvement in the scratch resistance. On the other hand, a surface layer having a thickness in excess of the above-specified range invites increase in the cost with no noticeable increase in the scratch resistance.

Next, the method for producing the medium of the present invention is described.

In the production of mediums having the structures shown in FIGS. 1 and 2, the supporting substrate 20 may be overlaid with the first dielectric layer 31, and then, with the light-transmitting substrate 2. When a medium of such structure having a recording layer comprising an organic die is produced, the light-transmitting substrate may be directly formed on the recording layer. When a read-only medium of such structure is produced, the light-transmitting substrate may be directly formed on the metal or semi-metal reflective layer.

In the meanwhile, when a medium having the structure of FIG. 3 is produced, the first dielectric layer may be formed on the surface of the light-transmitting substrate 2. When a medium of such structure having a recording layer comprising an organic die is produced, the recording layer may be directly formed on the light-transmitting substrate. When a read-only medium of such structure is produced, the metal or semi-metal reflective layer may be directly formed on the light-transmitting substrate.

When the medium has the structure of FIG. 3, the upper surface of the light-transmitting substrate 2 should be preliminarily formed with grooves, embossed pits, or other minute surface irregularities. A fluorohydrocarbon-based resin which has a high interatomic bond and a high thermal resistance, however, is often inferior in workability compared to general purpose thermoplastic resins such as polycarbonate and PMMA, and normally, it is quite difficult to form minute surface irregularities on the fluorohydrocarbon-based resin surface to the desired configuration with high accuracy. In view of the ease of forming the surface irregularities, the medium is preferably formed to the structures shown in FIGS. 1 and 2, and in such case, guide grooves, embossed pits, and the like can be preliminarily formed on the supporting substrate 20, and other layers can be formed on the supporting substrate 20. When a general purpose thermoplastic resin such as polycarbonate and PMMA is employed for the material of the supporting substrate 20, the guide grooves, the embossed pits, and the like may be formed on the surface of the supporting substrate 20 at the time of its production by injection molding. In the meanwhile, when the supporting substrate 20 is formed from a glass, the guide grooves, the embossed pits, and the like may be formed by the so called 2P process (photopolymer process).

The light-transmitting substrate 2 of the structure shown in FIGS. 1 and 2 can be produced by a method known in the art. To be more specific, the layer of the fluorohydrocarbon-based resin in the form of a substrate or a sheet formed by injection molding, extrusion, casting, or the like may be adhered by using an adhesive layer or a primer layer to the target surface, namely, to the surface of a reflective layer, a dielectric layer, a recording layer, or the like comprising an inorganic compound or an organic dye.

A fluorohydrocarbon-based resin, however, has an extremely low surface free energy, and the light-transmitting substrate containing a fluorohydrocarbon-based resin often fail to exhibit sufficient adhesion to the adhesive layer or the primer layer. In view of such situation, it is preferable that the fluorohydrocarbon-based resin has an adequate functional group introduced in its polymer backbone and/or side chain. Exemplary such functional groups include polar groups such as carbonyl group (—C(O)—), ester bond (—C(O)O—), ether bond (—COC—), an alkoxy group (—OR), thioether group (—CSC—), sulfinyl group (=SO), a thioalkoxy group (—SR), amide bond (—C(O)N(H)—), an amino group (—NR$_2$), siloxane bond (—SiO—), silanol group (—SiOH), and an alkoxysilyl group (—SiOR), and the light-transmitting substrate may be formed by using a fluorohydrocarbon-based polymer having such functional group introduced in its backbone and/or side chain. In the formulae above, R represents an organic residue such as a hydrocarbon residue. In such case, increase in the content of the functional group results in the increase of the adhesive strength, however, often with simultaneous increase in the light absorption in the short wavelength region. Accordingly, the type and the amount of the functional group may be adequately determined by taking into consideration the balance between the desired adhesive strength and the light absorption depending on the wavelength of the recording/reading beam employed.

When an adhesive layer or a primer layer is provided as described above, such layer would also constitute the light-transmitting substrate. An exemplary such adhesive layer is a resin layer containing a normal radiation-curable resin. On the other hand, the primer layer may comprise any suitably chosen material which exhibits sufficient adhesion for both the fluorohydrocarbon-based resin layer and the target surface of the adhesion, and which at the same time does not adversely affect the transmittance of the recording/reading beam. Preferably, the primer layer is formed from an organosilicon compound containing hydrolyzable silyl group such as a silane coupling agent. The term "organosilicon compound" used herein designates a compound having a hydrolyzable silyl group and an organic residue, and the silyl group adheres to the target surface of adhesion comprising a metal oxide or the like through physical adsorption or chemical bonding and the organic residue undergoes physical adsorption or chemical bonding to the functional group contained in the fluorohydrocarbon-based polymer. The organic residue may have a reactive group introduced therein to thereby facilitate the chemical reaction with the functional group in the fluorohydrocarbon-based polymer. Exemplary such reactive groups include vinyl group, glycidyl group, methacryl group, amino group, and mercapto group.

It is to be noted that the adhesive layer and the primer layer are markedly thinner than the fluorohydrocarbon-based resin layer with a typical thickness of about 0.1 to 5 $\mu$m. As a consequence, the influence of these layers on the optical properties of the overall light-transmitting substrate is small.

When the fluorohydrocarbon-based resin used for the light-transmitting substrate is soluble in an organic solvent, the light-transmitting substrate may be formed by dissolving the fluorohydrocarbon-based resin in an organic solvent and coating the solution on the target surface of the adhesion by any adequate method selected from known methods, and then removing the solvent. Exemplary coating methods include spin coating, gravure coating, dip coating, and spray coating. Again, a favorable adhesive strength to the target surface can be secured by introducing an adequate functional group in the polymer chain constituting the resin.

Alternatively, the light-transmitting substrate may be provided by adding an appropriate polymerization initiator to the monomer and/or macromer corresponding to the fluorohydrocarbon-based polymer to prepare a coating solution, applying the coating solution on the target surface of the adhesion, and curing the coating irradiating a radiation such as UV and/or heating to thereby form the light-transmitting substrate. In this case, a mixture of two or more types of fluorohydrocarbon-based monomers and/or macromers having different structures may be used so that these monomers and/or macromers are copolymerized. Alternatively, a hydrocarbon-based monomer and/or macromer containing no fluorine atom may be mixed with a fluorohydrocarbon-based monomer and/or macromer for copolymerization with the fluorohydrocarbon-based monomer and/or macromer. However, in terms of favorable light transmittance of the light-transmitting substrate, it is preferable that the coating solution is free from the hydrocarbon-based monomer and/or macromer. The method used for the coating in such case may also be selected from the known methods as mentioned above, and if desired, the coating solution used may be a solution prepared by further diluting the solution of the coating composition with an appropriate solvent.

Next, the components of the medium of the present invention are described in detail.

Light-transmitting Substrate 2

In the embodiments of the structures shown in FIGS. 1 and 2, the thickness of the light-transmitting substrate 2 is preferably up to 300 μm since the thin light-transmitting substrate 2 allows use of an objective lens with small numerical aperture NA. However, when the light-transmitting substrate 2 is too thin, unduly serious optical effects may be brought by the dust attached to the surface of the light-transmitting substrate 2. Accordingly, the thickness of the light-transmitting substrate 2 is preferably at least 5 μm, and in particular, at least 30 μm.

On the other hand, the light-transmitting substrate 2 of the structures shown in FIG. 3 is required to have a considerable thickness, and the thickness is preferably in the range of 0.3 to 2 mm, and more preferably 0.5 to 1.2 mm. When the light-transmitting substrate 2 is too thick in such embodiment, the medium will suffer from reduced tilt margin. When the light-transmitting substrate 2 is too thin, the medium will suffer from increase in errors due to deformation of the light-transmitting substrate.

First Dielectric Layer 31 and Second Dielectric Layer 32

These dielectric layers prevent oxidation and degradation of the recording substrate 4, and also, protect the supporting substrate 20 and the light-transmitting substrate 2 from the heat transmitted from the recording substrate 4 during the recording by blocking the heat or by dissipating such heat in lateral direction of the layer. Provision of the dielectric layers also contributes for improving the degree of modulation. The dielectric layer 31 and the dielectric layer 32 may also comprise a laminate of two or more dielectric layers each having different compositions.

The dielectric material used in the dielectric layers may be a compound containing at least one metal component selected from Si, Ge, Zn, Al, and rare earth metals, and the material is preferably an oxide, a nitride, or a sulfide. A mixture containing two or more of the foregoing may also be used. Exemplary preferable materials are a mixture of zinc sulfide and silicon oxide ($ZnS$—$SiO_2$), aluminum nitride, and aluminum oxide. It should be noted that these dielectric layers may also comprise a laminate of two or more dielectric layers each having different compositions. The thickness of the first and the second dielectric layers may be adequately determined so that sufficient improvement in the protection and degree of modulation are achieved. However, the first dielectric layer 31 is preferably deposited to a thickness of 30 to 300 nm, and the second dielectric layer 32 is preferably deposited to a thickness of 10 to 50 nm. The dielectric layers are preferably formed by sputtering.

Recording Substrate 4

The recording substrate 4 is not particularly limited for its composition, and the material used may be adequately selected from various phase change materials, and preferably, from those containing at least Sb and Te.

The recording layer is preferably formed to a thickness of more than 4 nm to 50 nm. When the recording layer is too thin, transformation into the crystalline phase will be difficult. When the recording layer is too thick, the recording layer will have an increased heat capacity to render the recording difficult. The recording layer is preferably formed by sputtering.

Reflective Layer 5

The reflective layer 5 may be formed from any desired material, and typically, the reflective layer 5 is formed from a metal or a semimetal such as Al, Au, Ag, Pt, Cu, or Si as a simple substance or as an alloy containing at least one of such metals. The reflective layer is preferably formed by vapor deposition such as sputtering and evaporation to a typical thickness of 10 to 300 nm.

Protective Layer 6

The protective layer 6 shown in FIG. 3 is provided for the purpose of improving scratch resistance and corrosion resistance. Preferably, the protective layer is formed from an organic material, and typically, from a film of cured radiation-curable compound. The protective layer typically has a thickness of about 0.1 to about 100 μm, and may be formed by any method commonly used in the art such as spin coating, gravure coating, spray coating, and dipping.

Supporting Substrate 20

The supporting substrate 20 in the embodiments of FIGS. 1 and 2 are provided for the purpose of maintaining the rigidity of the medium, and therefore, may not necessarily be light-transmitting. The supporting substrate 20 may comprise a resin, glass, ceramics, or the like, and exemplary resins which may be used include acrylic resins, polycarbonates, epoxy resins, and polyolefins.

The supporting substrate 20 is not particularly limited for its thickness. The thickness, however, is preferably in the range of 0.3 to 1.5 mm in view of the ease of molding and handling convenience during the formation of the information-recording layer.

EXAMPLES

Next, the present invention is described in further detail by referring to Examples which by no means limit the scope of the present invention. Comparative Examples are also described.

Example 1

A coating solution was prepared by diluting a fluorohydrocarbon-based resin (CYTOP CTX-800AP manufactured by Asahi Glass Company) represented by the following formula (1):

(1)

wherein x is 0 or 1, y is 0 or 1, and Z is 0, 1 or 2, with a fluorohydrocarbon-based solvent (CT-solv 180 manufactured by Asahi Glass Company) to 9% (mass %), and the coating solution was spin coated on a surface of a silica glass substrate having a thickness of 1.0 mm. The thus formed coating was dried by heating to 80° C. for 30 minutes, and cured at 120° C. for 2 hours. A light-transmitting substrate was thereby produced, and this light-transmitting substrate had a thickness of 200 μm.

Example 2

A light-transmitting substrate was formed on the silica glass substrate by repeating the procedure of Example 1 except that the fluorohydrocarbon-based resin used was CYTOPCTX-800SP manufactured by Asahi Glass Company.

Comparative Example 1

A coating solution was prepared by dissolving polymethyl methacrylate pellets in toluene/methyl ethyl ketone (volume ratio, 1/1) to a mass % of 20%, and the coating solution was coated on a surface of a silica glass substrate used in Example 1 with a bar coater. The thus formed coating was heated to 100° C. for 2 hours to thereby remove the solvent from the coating and form a light-transmitting substrate. The light-transmitting substrate had a thickness of 200 μm.

Evaluation

The samples for evaluation comprising the light-transmitting substrate on the silica glass substrate prepared in Examples 1 and 2 and Comparative Example 1 were measured for their transmittance spectrum by introducing a beam from the side of the sample where the light-transmitting substrate had been formed. The transmittance spectrum of the samples are shown in Table 4.

Figure 4:
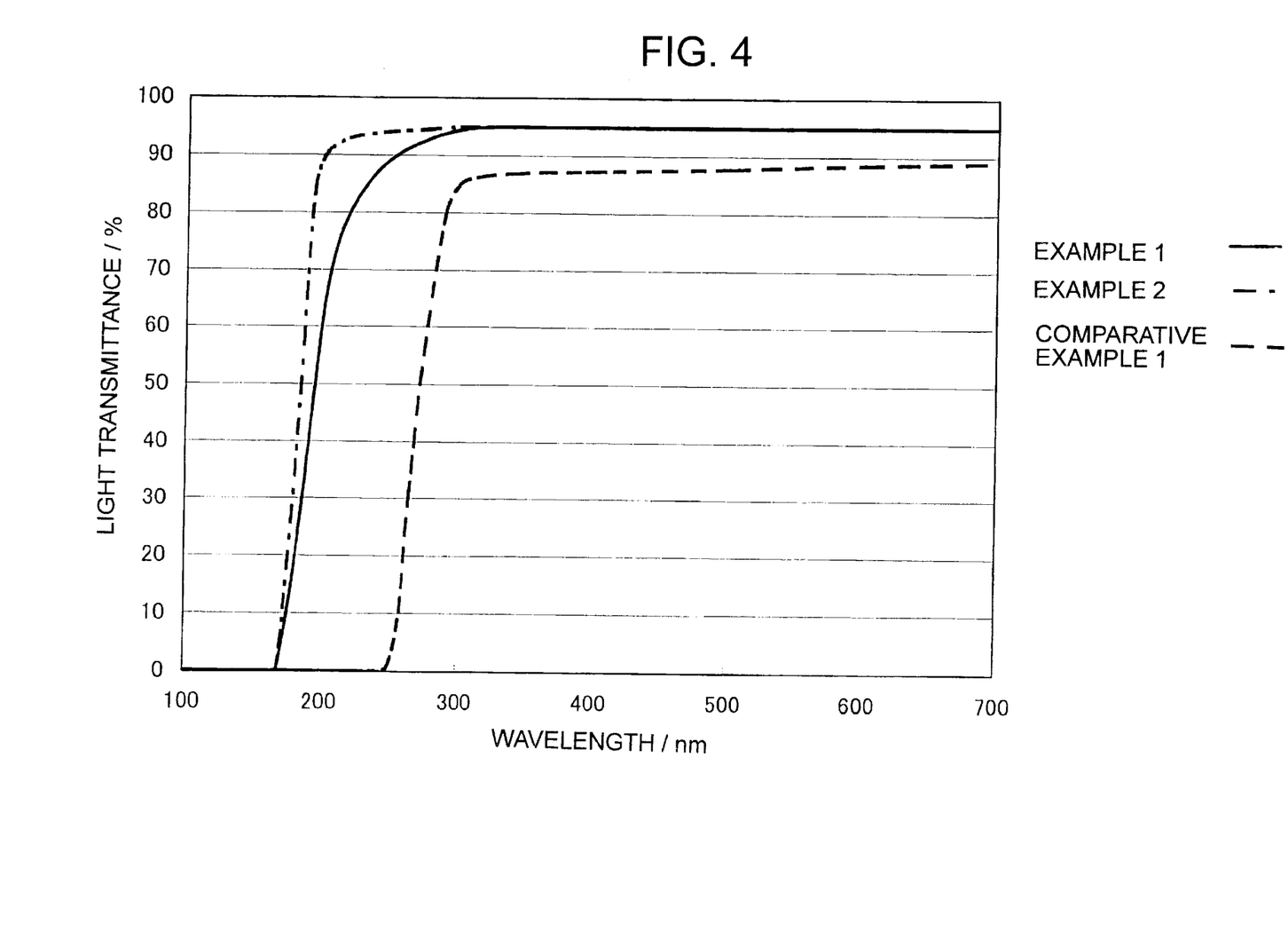
FIG. 4 is a graph showing transmittance spectrum of the light-transmitting substrate.

In FIG. 4, the light transmittance T in the wavelength range of 250 to 450 nm is not less than 0.8 in the whole range, whereas the light transmittance T is as low as about 0.1 at the wavelength near 250 nm in Comparative Example 1. The ΔT, on the other hand, is not more than 0.1 in Example 1 whereas it is far over 0.1 in Comparative Example 1. As seen from FIG. 4, the sample of Example 1 exhibits excellent transmittance even when the wavelength of the incident beam is as short as 250 nm while the sample of Comparative Example 1 undergoes abrupt increase in the absorption when the wavelength of the incident beam becomes shorter than 300 nm.

In FIG. 4, the sample of Example 2 exhibits a light transmittance T of not less than 0.8 and a ΔT of not more than 0.1 in the wavelength range of 200 to 450 nm.

Example 3

A silver reflective layer having a thickness of 100 nm was sputtered on the prepit-formed side of a polycarbonate substrate having an outer diameter of 120 mm and a thickness of 1.2 mm which has a surface preliminarily formed with prepits carrying random signal information. A light-transmitting substrate was formed on the surface of the reflective layer by repeating the procedure of Example 1 except that the light-transmitting substrate was formed to a thickness of about 100 μm to obtain the optical disk sample.

Comparative Example 2

An optical disk sample was prepared by repeating the procedure of Example 3 except that the light-transmitting substrate was formed to a thickness of about 100 μm by spin coating a UV-curable acrylic resin (SD-301 manufactured by Dainippon Ink & Chemicals, Inc.) and curing by UV irradiation using a high pressure mercury lamp at 550 mJ/cm².

The samples prepared in Example 3 and Comparative Example 2 were inserted in an optical disk drive to measure bit error rate (BER) of the signals in the reading. The reading beam of the optical disk drive used for the evaluation had a wavelength of 406 nm. Next, the samples were placed under Sunshine Weather Meter for exposure for 500 hours and 1000 hours. The results are shown in Table 1, and the criteria were ⊚ when BER was less than $1.0 \times 10^{-5}$, ◯ when the BER was not less than $1.0 \times 10^{-5}$ and less than $1.0 \times 10^{-4}$, and × when the BER was not less than $1.0 \times 10^{-4}$. The Sunshine Weather Meter used was Atlas Ci35A Weather-Ometer from Toyo Seiki Seisaku-Sho, Ltd. The light source used was 3500/6500 W long arc xenon tube which was the standard type equipped with the Weather-OMeter, and the radiation conditions were adjusted to fit for the methods of exposure to laboratory light sources defined in JIS K7350-2-1995.

TABLE 1

| | BER | | |
|---|---|---|---|
| | Initial | After 500 hour exposure | After 1000 hour exposure |
| Example 3 | ⊚ | ⊚ | ⊚ |
| Comparative Example 2 | ⊚ | ◯ | X |

As shown in FIG. 1, the sample of Example 3 which has the light-transmitting substrate comprising a fluorohydrocarbon-based resin in accordance with the present invention exhibited quite favorable initial BER as well as no increase in the BER after UV exposure. In contrast, the sample of Comparative Example 2 suffered from severe BER deterioration to indicate the poor weatherability.

The samples for evaluation prepared in Examples 1 and 2 and Comparative Example 1 were also subjected to the exposure test under the conditions as described above. The sample of Example 1 exhibited a light transmittance T of not less than 0.8 in the wavelength range of 200 to 450 nm after both 500 hour and 1000 hour exposures as well as the ΔT of not more than 0.1, indicating substantially no degradation of the layer. In contrast, in the case of the sample of Comparative Example 1, the light transmittance T reduced after 500 hour exposure. The sample of Example 2 also exhibited a light transmittance T of not less than 0.8 in the wavelength range of 200 to 450 nm after both 500 hour and 1000 hour exposures as well as the ΔT of not more than 0.1, indicating substantially no degradation of the layer.

Japanese Patent Application Nos. 279750/2000 and 204121/2001 are incorporated herein by reference. Although some preferred embodiments have been described, many modifications and variations may be made thereto in the light of the above teachings. It is therefore to be understood that within the scope of the appended claims, the invention may be practiced otherwise than as specifically described.

What is claimed is:

1. An optical information medium comprising an information-recording layer and a light-transmitting substrate, which is used such that a laser beam for recording and/or reading reaches said information-recording layer through said light-transmitting substrate, wherein said light-transmitting substrate has a light transmittance T and difference ΔT between the maximum value and the minimum value of the light transmittance T in an arbitrary wavelength range of 10 nm which satisfy the relations:

T≧0.8,

ΔT≦0.10 at least in the wavelength region of 250 to 450 nm.

2. An optical information medium according to claim 1 wherein the relations:

T≧0.8,

ΔT≦0.10 are satisfied at least in the wavelength region of 200 to 450 nm.

3. An optical information medium according to claim 1 wherein the relations:

$$T \geq 0.8,$$
$$\Delta T \leq 0.10$$

are satisfied at least in the wavelength region of 250 to 450 nm after 500 hour exposure to laboratory light used in the methods of exposure to laboratory light sources defined in JIS K7350-2-1995.

4. An optical information medium according to claim 1 wherein said light-transmitting substrate includes at least one resin layer, and at least one layer of said resin layer(s) contains a fluorohydrocarbon-based resin.

5. An optical information medium according to claim 1 wherein said light-transmitting substrate has a surface layer which constitutes the beam incident surface of the medium and an inner layer between said surface layer and said information-recording layer;

said inner layer is a resin layer containing a fluorohydrocarbon-based resin;

said surface layer comprises an organic compound other than said fluorohydrocarbon-based resin and/or an inorganic compound; and said surface layer has a thickness less than that of said inner layer.

6. An optical information medium according to claim 4 wherein said resin layer containing the fluorohydrocarbon-based resin is amorphous.

7. An optical information medium according to claim 1 wherein the light-transmitting substrate has a thickness of 5 to 300 $\mu$m.

* * * * *